United States Patent
Nelson (10) Patent No.: US 7,451,841 B2
(45) Date of Patent: Nov. 18, 2008

(54) MOBILE TRAILER HITCHING APPARATUS

(76) Inventor: Larry Nelson, 710 PMB 558, Hwy. 51 N., Dyersburg, TN (US) 38024

( * ) Notice: Subject to any disclaimer, the term of this patent is extended or adjusted under 35 U.S.C. 154(b) by 239 days.

(21) Appl. No.: 10/902,730

(22) Filed: Jul. 29, 2004

(65) Prior Publication Data

US 2005/0103541 A1 May 19, 2005

Related U.S. Application Data

(60) Provisional application No. 60/491,226, filed on Jul. 29, 2003.

(51) Int. Cl.
*B62D 51/04* (2006.01)
(52) U.S. Cl. .................... 180/13; 180/19.1
(58) Field of Classification Search .............. 280/3, 280/475, 477, 767; 180/13, 14.2, 19.1, 19.2, 180/65.5; 254/420, 423
See application file for complete search history.

(56) References Cited

U.S. PATENT DOCUMENTS

| | | | |
|---|---|---|---|
| 3,166,141 A | 1/1965 | Shields et al. | 180/21 |
| 3,370,666 A | 2/1968 | Holtzclaw et al. | 180/26 |
| 3,439,764 A | 4/1969 | Kimball | 180/12 |
| 3,819,001 A | 6/1974 | Pavelka | 180/19 H |
| 3,865,204 A | 2/1975 | Bueckner, Sr. | 180/12 |
| 3,942,823 A | 3/1976 | Shields et al. | 280/423 R |
| 4,210,217 A | 7/1980 | Lachowicz | 180/13 |
| 4,629,020 A | 12/1986 | Thurman | 180/19.2 |
| 4,860,841 A * | 8/1989 | Sacco | 180/13 |
| 5,139,102 A | 8/1992 | Pocapalia | 180/19.2 |
| 5,282,605 A * | 2/1994 | Sauber | 254/420 |
| 5,343,969 A | 9/1994 | Taylor | 180/19.1 |
| 6,347,677 B1 | 2/2002 | Collins | 180/13 |
| 6,439,545 B1 | 8/2002 | Hansen | 254/420 |
| 6,619,671 B1 | 9/2003 | Fine | 280/3 |
| 6,945,343 B1 * | 9/2005 | Moreau et al. | 180/13 |
| 6,991,050 B1 * | 1/2006 | Sanford et al. | 180/13 |

OTHER PUBLICATIONS

International Search Report and Written Opinion, PCT/US2004/024563, Apr. 10, 2007.

* cited by examiner

*Primary Examiner*—Tony H. Winner
(74) *Attorney, Agent, or Firm*—Baker Donelson Bearman Caldwell & Berkowitz, PC (57) ABSTRACT

A trailer loading or hitching device for moving a trailer between a storage position and attachment of a tongue of the trailer to a tow vehicle, comprising a vertical lifting column selectively extendable and retractable by a mover and pivotally connected to a drive wheel chassis by a mount for a steering shaft operatively engaged to the lifting column, the drive wheel chassis having opposing drive wheels selectively operable for moving the chassis.

43 Claims, 9 Drawing Sheets

MOBILE TRAILER HITCHING APPARATUS

The present application claims priority benefit of co-pending provisional application Ser. No. 60/491,226, filed Jul. 29, 2003.

FIELD OF THE INVENTION

The present invention relates to devices for connecting a vehicle or object to be towed with a towing vehicle. More specifically, the present invention relates to devices that lift trailer tongues and propel trailers for hitching a coupler on the tongue of the trailer to a receiver hitch on a towing vehicle.

BACKGROUND OF THE INVENTION

Anyone familiar with trailer hitches is aware that attaching, or hitching, a trailer vehicle to be towed to a vehicle supplying the towing power can be difficult and can result in damage to the towing vehicle. Many devices have been marketed to make this process easier, yet moving and attaching trailers to tour vehicles still remains a challenge. In order to connect the trailer to the towing vehicle, it is generally necessary to back the towing vehicle toward the trailer in close enough proximity for the coupler on the trailer tongue to be connected to the receiver hitch, which is often located on the bumper of the towing vehicle. This requires a certain degree of precision, which is usually achieved after considerable trial and error, as well as potential damage to the trailer and to the towing vehicle.

Figure 1:
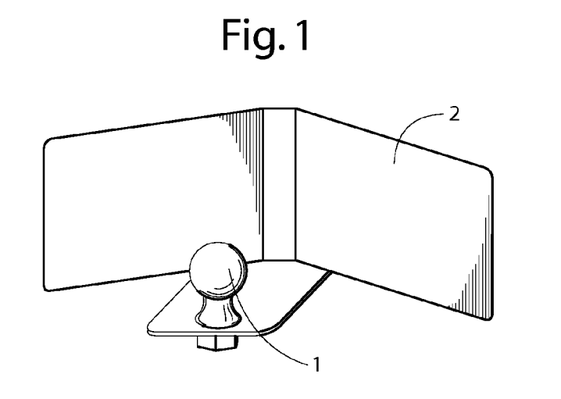

Many devices have been manufactured to address the need to make this process easier and to minimize damage to the towing vehicle. Some use a mirror positioned over the receiver hitch to allow the driver of the towing vehicle to better view the distance between the coupler and the receiver hitch. Others, such as the one shown in FIG. 1, use a metal plate formed in a V-shape 1 and attached to the receiver hitch 2 so that the plate provides both a guide for the coupler and trailer tongue and a barrier for the tongue, minimizing damage to the towing vehicle if the driver of the towing vehicle is reasonably adept at steering the towing vehicle to the coupler on the trailer tongue.

Some devices, such as those described in U.S. Pat. Nos. 4,629,020; 5,343,969; 3,942,823; 4,210,217; 3,370,666; and 3,439,764 are designed to move the trailer in order to position the trailer tongue in close enough proximity to the receiver hitch on the towing vehicle to facilitate attachment of the hitch. These devices may be motorized or non-motorized. They must be available at the site where the trailer is to be hitched to the towing vehicle, however, and this is often not feasible at each location where a trailer is to be hitched to, and unhitched from, the towing vehicle. Most of the devices are too heavy and cumbersome to be carried from location to location attached to either the trailer or the towing vehicle.

Despite the significant effort made to resolve the problems associated with hitching a trailer to a towing vehicle, as indicated by the aforementioned United States Patents, there continues to be a need for a device or method that will allow a trailer tongue coupling to be brought into contact with a receiver hitch on a towing vehicle without requiring the towing vehicle to be backed toward the tongue or transporting a separate towing device to move the trailer tongue into closer proximity to the receiver hitch on the towing vehicle. It is to such that the present invention is directed.

SUMMARY OF THE INVENTION

The present invention meets the need in the art for a drivable device having a vertically extendable column attachable to a trailer for selective operation to attach and detach trailers from towing vehicles. The present invention provides a trailer loading device for moving a trailer between a storage position and attachment of a tongue of the trailer to a tow vehicle, comprising a vertical lifting column selectively extendable and retractable by a mover, said vertical lifting column having a steering shaft at a lower end, said vertical lifting column rotatably connected to a chassis by a mount that receives a portion of the steering shaft, the chassis having opposing drive wheels selectively operable by a first actuator and a second actuator for moving the chassis.

Objects, advantages, and features of this present invention will become apparent upon reading the following detailed description in conjunction with the drawings and the claims.

BRIEF DESCRIPTION OF THE DRAWINGS

FIG. 1 illustrates a receiver hitch as found in the prior art. Attached adjacent to the ball coupling 1 is a V-shaped metal plate 2 that provides a guide for the trailer tongue coupling, as well as a shield for the bumper of the towing vehicle.

DETAILED DESCRIPTION

The inventor has discovered a novel trailer loading device (or hitching device) and method for moving a vehicle to be towed, such as a trailer, into close proximity with a receiver hitch on a towing vehicle. The device also provides a method for hitching a coupling on the tongue of a trailer to a receiver hitch on a towing vehicle.

It should be apparent to those of skill in the art that the invention has utility for many types of devices that must be moved by means of a towing vehicle. Furthermore, those of skill in the art are aware that a towing vehicle can be, for example, a car, truck, sport utility vehicle (SUV), tractor, or other vehicle having the ability to pull a second vehicle or device. The towing vehicle can be powered by an electric motor, internal combustion engine, or other device for producing sufficient power to achieve movement of the towing vehicle. The towing vehicle can move by means of wheels, tracks, or other devices for reducing the effect of friction. Similarly, the means for reducing friction and facilitating forward and reverse motion for the present invention can be a single wheel, two or more wheels, one or more tracks, or other similar devices.

The vehicle to be towed, such as a trailer, can be a boat trailer, horse trailer, utility trailer, camping trailer, or other similar device. Generally, a trailer is provided with a tongue which contains, or is attached to, a coupling or coupling device. The coupling is brought into close proximity with a receiver hitch on a towing vehicle, and the trailer is hitched to the towing vehicle by means of the attachment of the coupling to the receiver hitch. Receiver hitches can be designed to withstand various amounts of trailer weight. For example, a Class I hitch is capable of pulling up to 2,000 pounds of gross trailer weight, while a Class IV hitch can be used with a gross trailer weight of up to 12,000 pounds.

The receiver hitch is usually brought into close proximity to the coupling on the tongue of the trailer by backing a towing vehicle such as a car, truck, SUV, or other towing vehicle to which the receiver hitch has been attached, toward the coupling on the tongue of the trailer. The present invention, however, attaches to the tongue or side of the trailer to allow the trailer to be guided toward the receiver hitch. A remote control device allows an individual to stand near the trailer and guide the trailer toward the towing vehicle while being able to clearly see the path of the trailer and the distance to the front or rear of the towing vehicle and the receiver hitch. Once in close enough proximity to the receiver hitch, the coupling can be raised sufficiently, by means of the vertical column on the hitching apparatus of the present invention, to be positioned over the receiver hitch, then lowered by means of the vertical column to connect the coupling with the receiver hitch to provide a secure connection between the towing vehicle and the trailer.

An advantage of the hitching apparatus of the present invention is that it can be provided separately, to be easily mounted on the trailer, or can be manufactured as a component of the trailer. An additional advantage of the present invention is the more compact design, as distinguished from prior art devices that are designed for moving trailers to bring them closer to towing vehicles, allowing the hitching apparatus of the present invention to be easily transported wherever the trailer is transported, thereby facilitating uncoupling and re-coupling of the trailer to the towing device, as needed. The hitching apparatus can also be removed from one trailer and placed on another, as needed.

Figure 2:
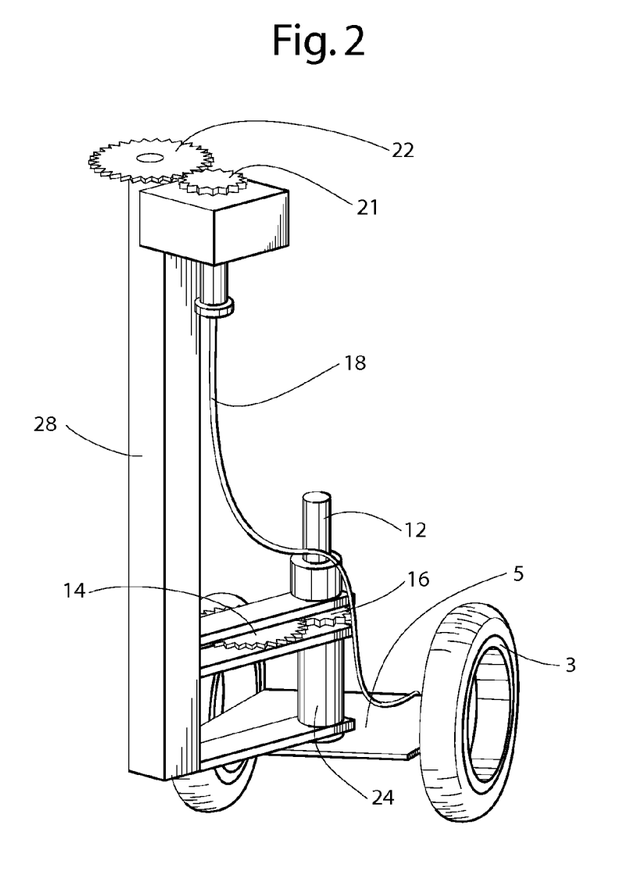
FIG. 2 is a line drawing illustrating the hitching apparatus of the present invention.
Figure 3:
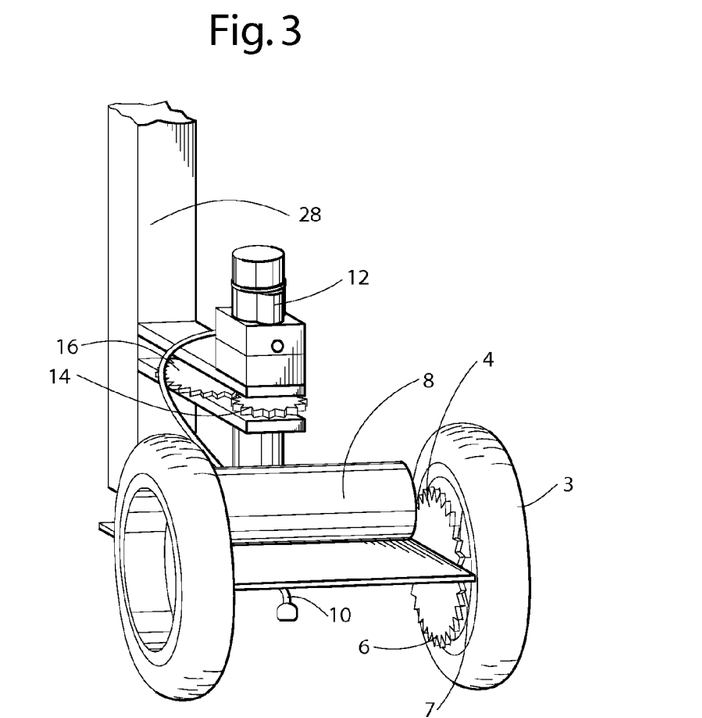
FIG. 3 is a view of the hitching apparatus of the present invention enlarged to illustrate the location of the first motor 8, first gear 4, and second gear 6 which provide for movement of the hitching apparatus in a forward and backward direction.

Referring now to FIG. 2, a general view of one embodiment of the present invention, and FIG. 3, a larger view of the portion of the invention that provides forward movement and rotation of the wheels, a first engine 8 is operably connected to rotate or drive a first gear 4, which is operably connected to a second gear 6. The second gear 6 receives an axle 7 so that the axle is rotated as the gear is rotated by its interaction with the first gear 4. Attached to the axle 7 are one or more wheels 3 which rotate on the axle 7. The first engine can be powered by any means that would provide sufficient energy to rotate the first gear and second gear. One source of power can be a battery, such as that found in a camping trailer, boat carried by a boat trailer, or other battery-powered device. Such batteries can be, for example, 12 volt (12V), 24 volt (24V), or 36 volt (36V). To connect the hitching apparatus of the present invention to the power source, a retractable power cord 10 can be provided.

Upon providing power to the first motor, the first gear is turned. The first gear turns the second gear, which in turn rotates the axle and one or more wheels to provide forward or reverse motion for the hitching apparatus.

Figure 5:
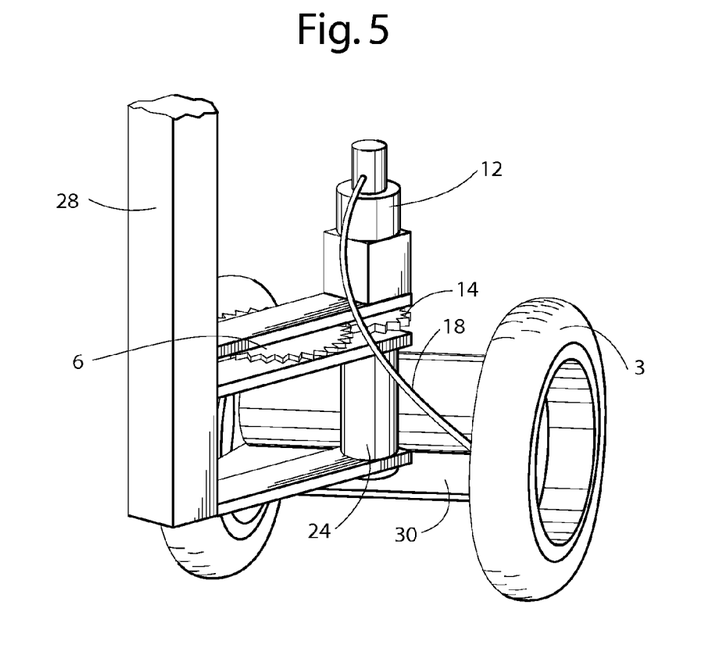
FIG. 5 is a view of the second motor 12, third gear 14, and fourth gear 16 of the present invention, which provide for rotation of the axle to allow the wheels to be turned to facilitate steering.

While the first motor, first gear, and second gear provide forward and reverse motion for the wheel or wheels, a second motor 12, which drives a third gear 14 operably connected to the second motor, provides rotation about a vertical axis due to the interaction of the third gear 14 which is operably connected to a fourth gear 16, the fourth gear being connected to a pivot column 24, as shown in FIG. 5. The pivot column 24 is positioned upon a base plate 30 and attached so that it can rotate about a vertical axis The first motor and second motor are supplied with power through a power cord 18, which also supplies power to a third motor 20.

Figure 4:
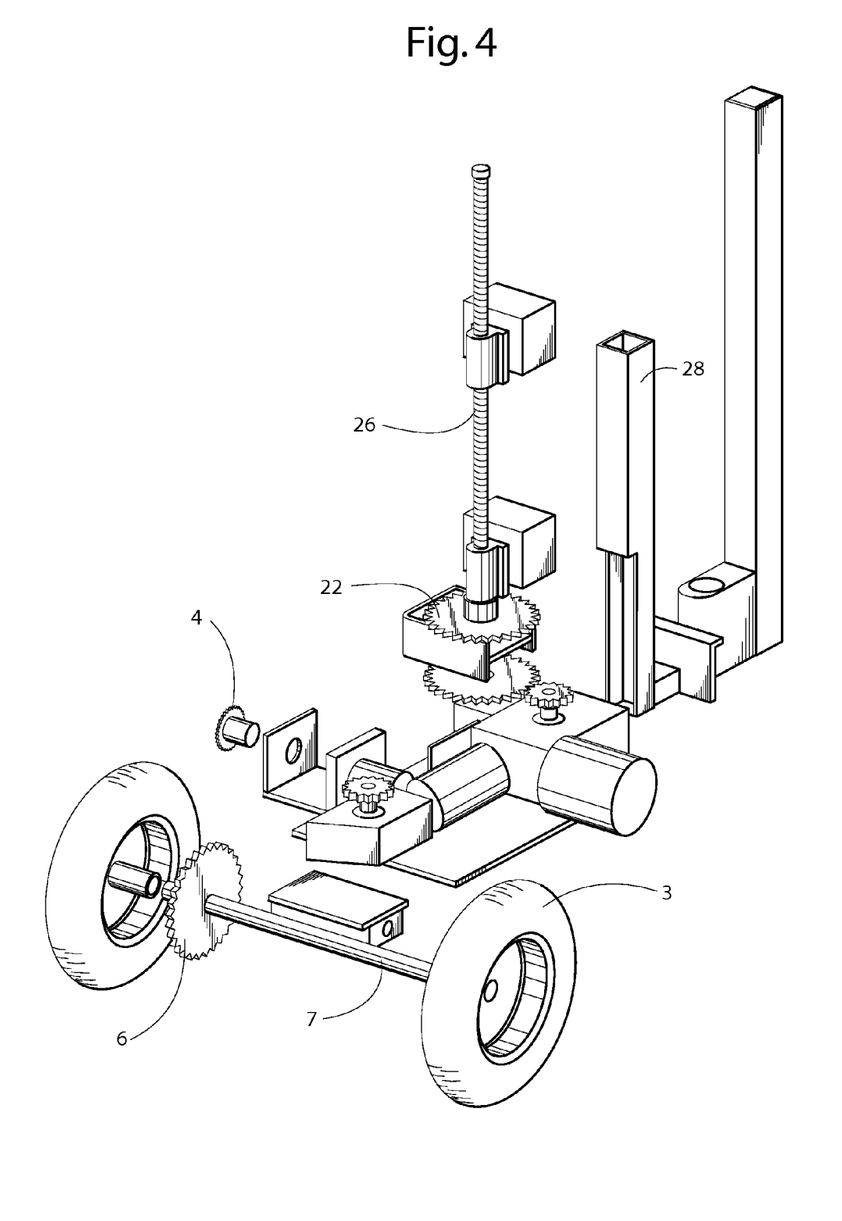
FIG. 4 is a line drawing illustrating an alternate embodiment of the hitching apparatus of the present invention.

The third motor 20 drives a fifth gear 21, which is operably connected to both the third motor and a sixth gear 22. A threaded rod or screw member 26, such as that shown in FIG. 4, is placed through the sixth gear 22, much as the axle 7 is placed through the second gear 6. Upon supplying power to the third motor 20, the sixth gear 22 is turned, which, in turn, causes the threaded rod to turn. In an embodiment of the invention as illustrated in FIG. 4, the threaded rod is placed on the outside of a vertical column 28. In an embodiment of the invention as illustrated in FIG. 2, FIG. 3, and FIG. 4, the threaded rod is placed on the inside of the vertical column and threaded through a bushing which has been welded in place within the vertical column. The bushing is provided with threads, so that the threaded rod can be inserted through the bushing and moved upward or downward through the bushing as the sixth gear 22 turns the rod in a clockwise or counterclockwise direction. As the threaded rod is moved through the bushing in an upward or downward direction, it moves the vertical column upward or downward, depending upon the clockwise or counterclockwise turn of the threaded rod attached to the sixth gear.

To operate the hitching apparatus, a remote control device is provided. Such devices are well known to those of skill in the art and are often used to direct the movement of simple, engine-powered vehicles. It is well within the expertise of someone of skill in the mechanical arts to provide one or more motors, such as the first motor, second motor, and third motor of the present invention, which can be operated by means of a remote control device. The device can be attached to the hitching apparatus by means of an electronic cord, or can be operated independently of the hitching apparatus and its power supply.

Once the vertical column 28 of the present invention is attached to the tongue or other location on a trailer, the tongue can be raised or lowered by means of the third motor and its connection with the fifth gear, sixth gear, threaded rod, and bushing. The direction of turn of the threaded rod can be controlled by means of the remote control device, to provide for the vertical column to be raised or lowered as needed, thereby raising or lowering the tongue of the trailer. The trailer can be moved toward the towing vehicle by means of the wheel or wheels, being driven by the first motor, first gear, and second gear being operably connected to the axle. By means of the remote control device, the wheel or wheels can be rotated either clockwise or counterclockwise, to achieve either forward or reverse motion. As the trailer is being moved toward the towing vehicle, the second motor can be controlled by the remote control device, with the degree of clockwise or counterclockwise rotation of the fourth gear determining the degree and direction of turn of the apparatus, providing the operator of the remote control device with the ability to determine the direction of the desired motion and to steer the trailer toward the towing vehicle with precision.

It should be apparent to those of skill in the art that such movement—forward and reverse, left or right, can be achieved by one wheel, two wheels, or multiple wheels and the hitching apparatus can be designed to utilize any combination of wheels, tracks, or other devices which reduce the effects of friction and allow the hitching apparatus to be more easily moved.

It will also be apparent to one of skill in the art that movement of the vertical column may be achieved by a number of combinations of placement of a threaded rod or other similar device and placement of gears which can cause the movement of that device.

The gear ratio of the gears described in one embodiment of the gear-driven device of the present invention is 5:1. At that ratio, sufficient rotation of the wheels of the hitching apparatus is provided to move many horse trailers, boat trailers, and utility trailers. It is within the skill of one skilled in the mechanical arts, however, to alter the gear ratio to produce a hitching apparatus which can move larger or smaller vehicles. It is also within the skill of one of skill in the art to utilize three or more gears, where two are illustrated in the embodiment of the invention described in FIG. 2, FIG. 3, and FIG. 4, to achieve the necessary clockwise or counterclockwise motion of the axle, pivot column, and threaded rod.

While it is convenient to utilize the retractable power cord of one embodiment of the invention to supply power to the motors by connecting the cord to, for example, the battery of a boat being transported by the trailer, it would also be convenient to provide a separate battery for the hitching apparatus in order to make it a self-contained unit.

It will be apparent to those of skill in the mechanical arts that certain devices can be incorporated into the present invention to add to its functionality. For example, limit switches can be used to limit disconnect the power to the motor when the desired turning radius has been exceeded and a magnetic brake can be utilized to limit the reverse rotation of the wheels when the hitching apparatus is in a stopped position.

Figure 6:
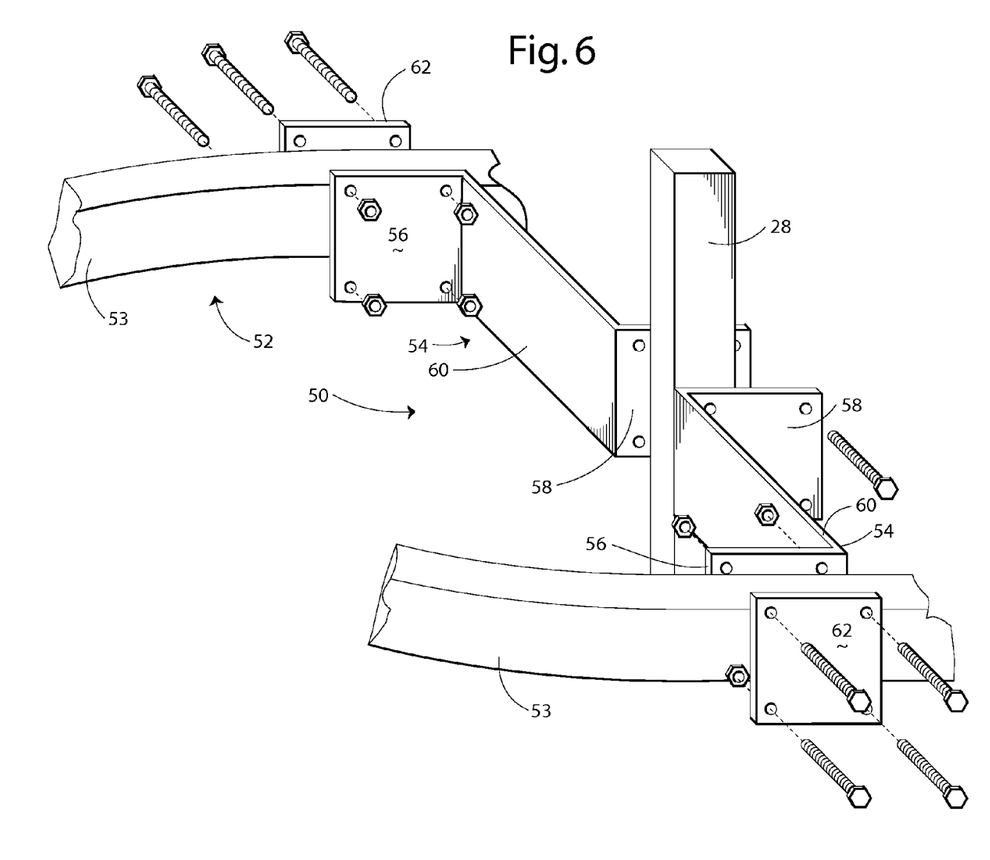
FIG. 6 is a perspective illustration of a brace for attaching the trailer loading device to a tongue of a trailer.

FIG. 6 is a perspective view illustrating a brace 50 for attaching the trailer loading device according to the present invention to a tongue generally 52 of a trailer (not illustrated). The brace 50 includes a pair of inner supports 54 having a substantially Z-shape in appearance as defined by opposing connector plates 56, 58 interconnected by a transverse member 60. An outer plate 62 mounts outwardly of a support beam 53 of the trailer tongue 52. The connector plates 56, 58 and the outer plate 62 define a plurality of openings for passage of bolts that engage opposing nuts for rigidly securing the trailer loading device of the present invention to the tongue 52 of a trailer. It is to be appreciated that other bracing and support devices may be gainfully used with the present invention. Generally, the trailer towing device should be positioned on a longitudinal axis of the trailer to facilitate operational control of the trailer during movement.

Figure 7:
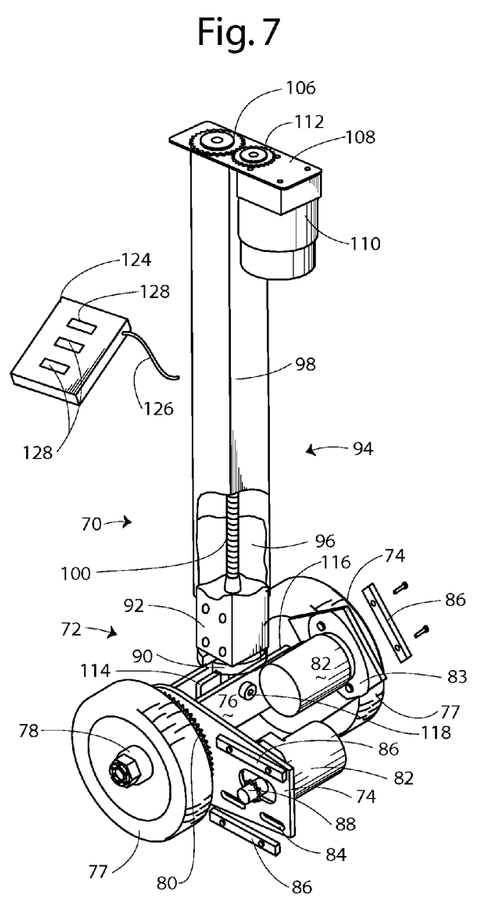
FIG. 7 is a perspective cut-away view of a alternate embodiment of the trailer loading device according to the present invention.

FIG. 7 is a perspective cut-away view of an alternate embodiment of a trailer loading device 70 according to the present invention. The trailer loading device 70 includes a lower chassis 72 formed by a pair of opposing plates 74 interconnected by a pair of spaced-apart transverse supports 76 best illustrated in FIG. 10. A wheel 77 mounts to an axle 78. Two wheels 77 are provided, each on an independent axle 78. The axles include a slot for a key for operatively engaging the wheel to the axle. A gear 80 mounts to the axle between the wheel 77 and the plate 74, and includes a key to connect to the axle. An actuator 82 mounts to a portion of the plate 74. The plate defines opposing openings 84 for receiving fasteners to secure the actuator 82 to the plate 74. The openings in the illustrated embodiment are elongate slots. A tap bar 86 defines openings through which the fasteners for the actuator extend. A drive gear 88 connects to the actuator 82 for rotation by the actuator. A chain (not illustrated) or other interconnection member connects the drive gear 88 to the gear 80 in order to rotate the wheel 77, as discussed below. The tap bar 86 is movable in the openings 84 to enable tightening the chain relative to the gears 80, 88. In the illustrated embodiment, the actuator 82 is an electric motor. The actuator 82 has a flange 83 that defines openings that align with the openings 84 for receiving fasteners to secure the actuator to the plate.

The steering shaft 90 attaches to the chassis 72 and rotatably engages a mount block 92. The mount block 92 connects to a telescopically extendable lifting column generally 94. The lifting column 94 has an inner tubular member 96 that attaches at a lower end to the mount block 92 with bolts. An outer tubular member 98 slidingly receives the inner member 96. In the illustrated embodiment, the inner member 96 and the outer member 98 move relative to each other by a threaded shaft 100 disposed on the interior of the telescoping lifting column 94.

As illustrated in FIG. 7, the side plates 74 are disposed in spaced-apart and angularly offset relation, whereby the actuators 82 are vertically offset relative to each other. This facilitates a compact to balanced trailer loading device gainfully operated for moving a trailer between a storage place and a vehicle for towing the trailer, as discussed below.

Figure 8:
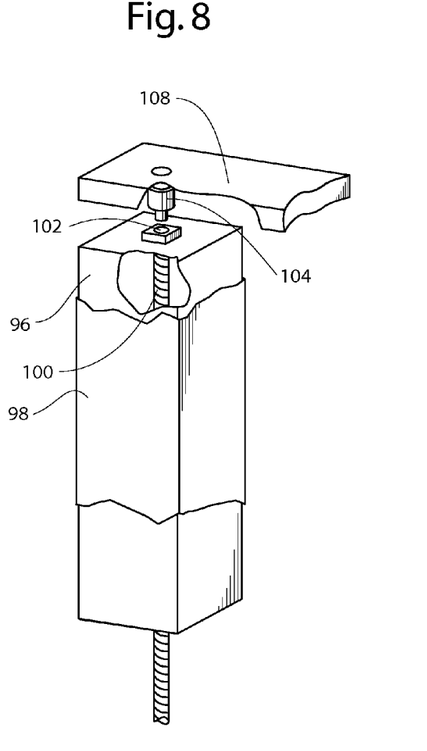
FIG. 8 is a perspective fragmentary and cut-away view illustrating a portion of the telescoping lift column used in the loading device illustrated in FIG. 7.

As best illustrated in perspective fragmentary and cut-away view in FIG. 8, the threaded shaft 100 extends through a threaded opening at the distal end of the inner member 96. A bushing 104 extends through an opening in the distal end of the outer member 98 and engages a gear 106 disposed outwardly of a mounting plate 108. An actuator, such as an electric motor 110 connects to the mounting plate 108. A drive gear 112 connects to the actuator 110 and engages the gear 106.

Figure 9:
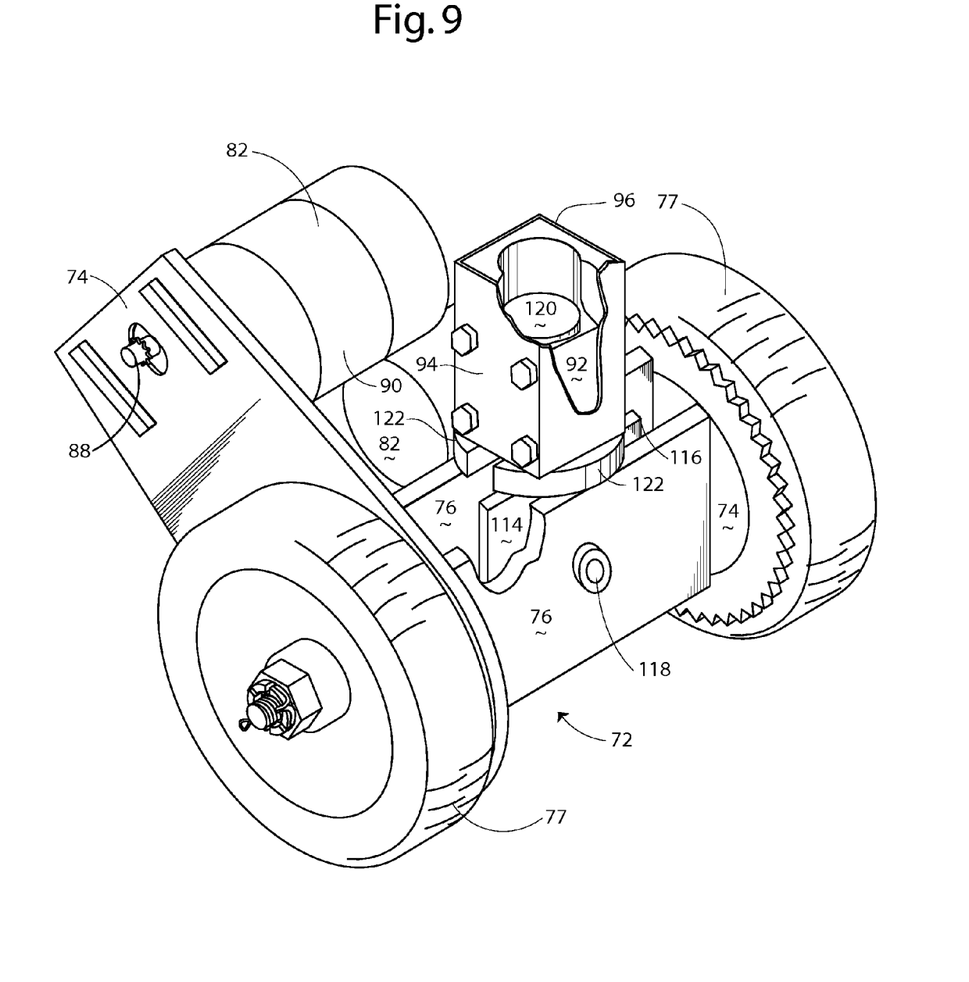
FIG. 9 is a perspective cut-away back view of a chassis for the loading device illustrated in FIG. 7.
Figure 9A:
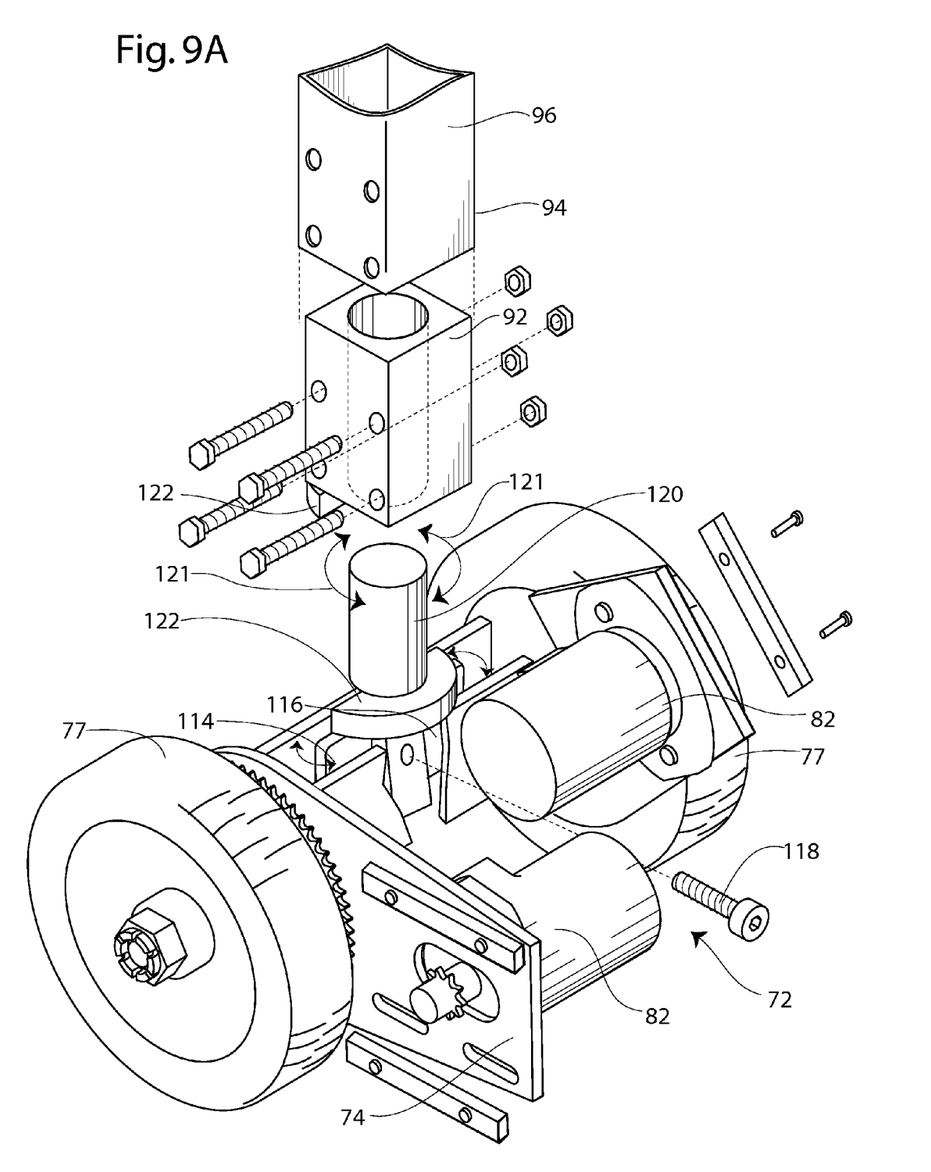
FIG. 9A is a detailed exploded view depicting the rotatable engagement of the steering shaft to the mount block.

FIG. 9 is a back view of the chassis for the trailer loading device 70 to particularly illustrate the interconnection between the steering shaft 90 and the mount block 92. FIG. 9A is a detailed exploded view thereof depicting the rotatable engagement of the steering shaft 90 to the mount block 92. The steering shaft 90 includes two laterally extending plates 114, 116 extending two laterally extending plates 114, 116 extending from a base portion 117 that defines an opening for receiving a pin or bolt 118 for securing the steering shaft 90 to the transverse support 76. A cylindrical shaft 120 extends upwardly and is received in a cylindrical recess in the mount block 92 as shown in cut-away view. An upper end of the cylindrical shaft 120 defines a groove which receives a ring or clip for securing the cylindrical shaft to the mount block 92 while permitting rotation of the steering shaft 90 relative to the mount block 92. A support 122 defines a curved rotation support disposed on an upper edge of both of the transverse members 76. A fitting (not illustrated) attaches to a side of the mount block communicating lubricant into the recess to facilitate rotation of the shaft 120.

With reference again to FIG. 7, a controller 124 detachably couples through a cable 126 to the trailer moving device 70. The controller 124 includes selectively actuated switches 128 for selectively operating the actuators 82 and 110. The cable 126 operatively engages a supply of electrical current, such as a battery or other source of electrical current for operating the actuators 82 and 110.

Figure 10:
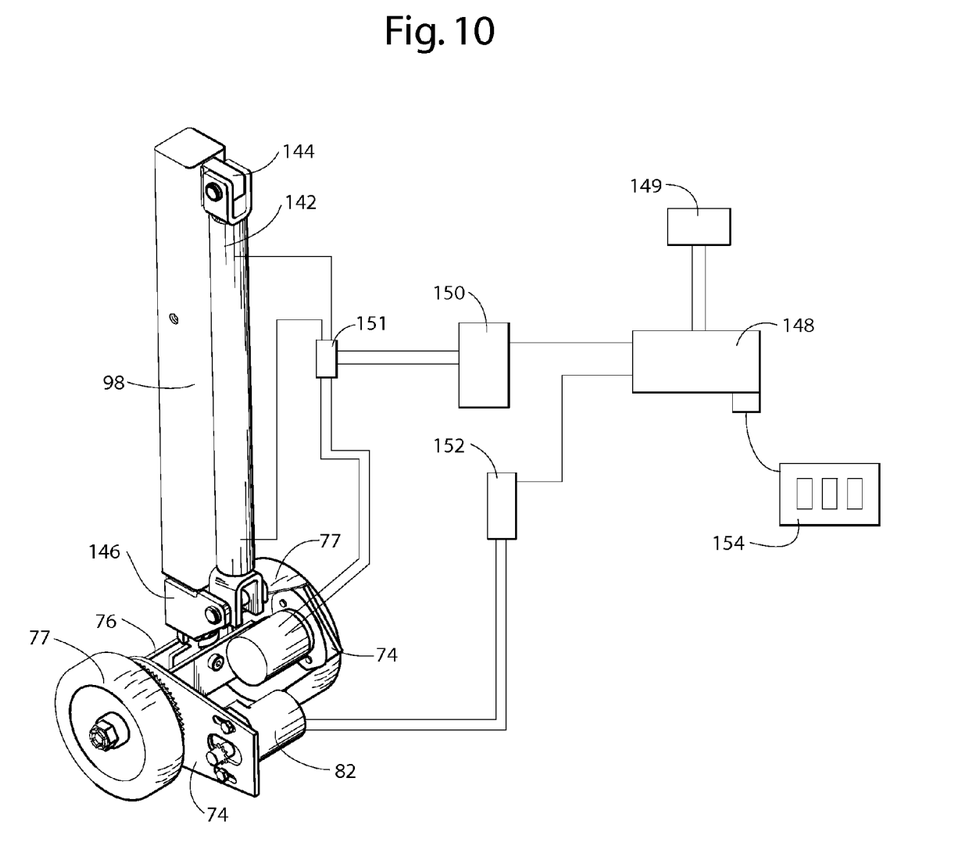
FIG. 10 is a perspective view of an alternate embodiment of the trailer loading device according to the present invention.

FIG. 10 is a perspective view of an alternate embodiment of the trailer towing device 140 in which the actuators 82 are hydraulic motors. In this embodiment, the telescoping lifting column 94 extends and retracts by a hydraulic cylinder 142. The hydraulic cylinder 142 attaches at a first distal end to a flange 144 that extends laterally from a distal end of the outer member 98. An opposing distal end of the hydraulic cylinder 142 connects to a flange 146 extending from the mount block 90. As illustrated schematically, a control box 148 connects to a supply of electrical current such as a battery 149 and operatively connects to a pair of hydraulic pumps 150, 152 which communicate with a supply of hydraulic fluid. The battery and the hydraulic pumps with reservoirs of hydraulic fluid readily mount to the trailer. The pump 150 communicates through hoses selectively through a diverter valve 151 with one of the actuators 82 and with the hydraulic cylinder 142. The hydraulic pump 152 communicates through hoses with the other actuator 82. A controller 154 selectively connects to the control box 148 though a detachable plug 156. The controller 154 includes three switches 155, 157, and 159 for selective operation of the actuators 82 and the hydraulic cylinder 142. The switches are center neutral, double throw for selective activation. The switches 155, 157 direct the communication of hydraulic fluid from the pumps 150, 152, respectively. The switch 159 selectively positions the diverter valve 151 for rotating the wheels 77 or for operating the hydraulic cylinder 142. The pumps 150, 152 are reversible so that the wheels can be operated in a first direction and in an opposite direction for forward and reverse travel and for raising and lowering of the lifting column 94.

Figure 9B:
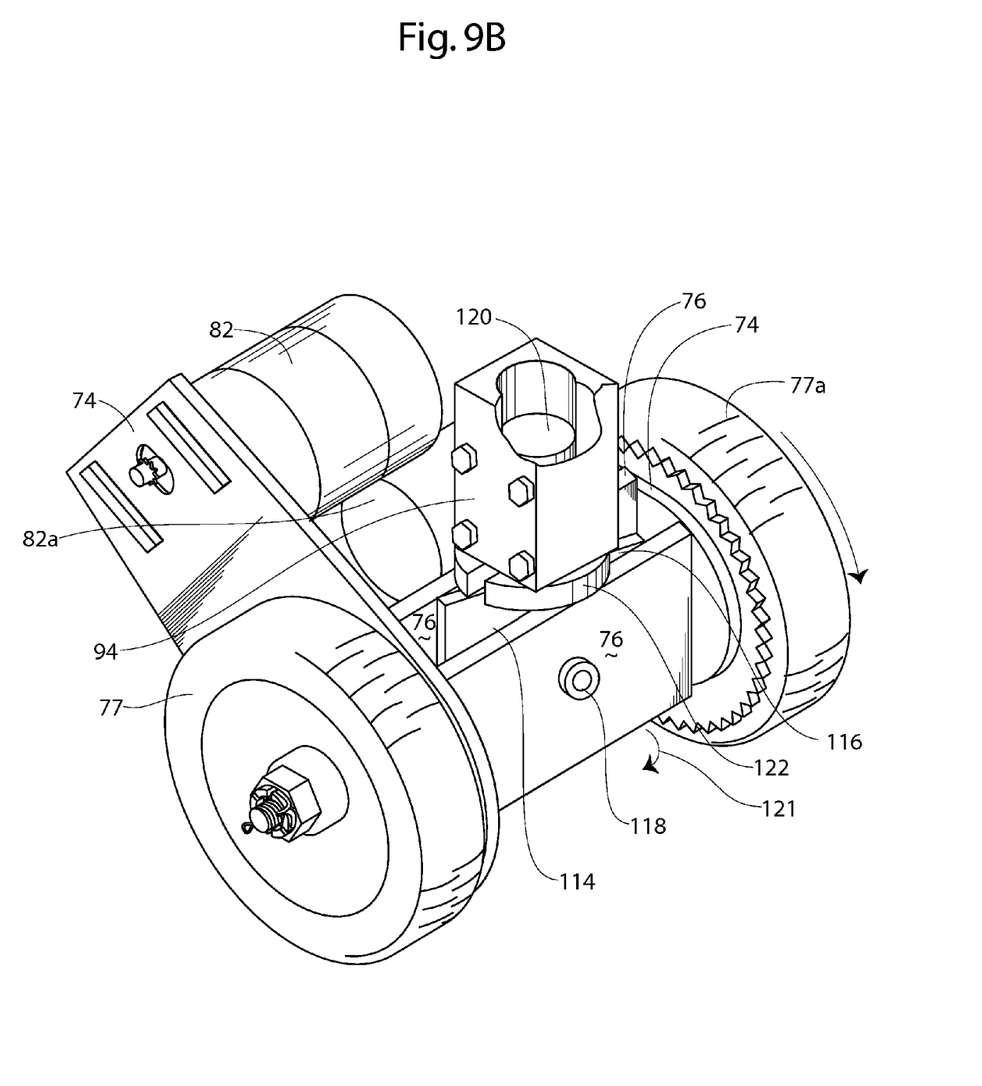
FIG. 9B illustrates the lifting column engaged with the mount block and the chassis rotated relative to the lifting column upon operation of one of the drive wheel acutators.

With reference to FIG. 7, the trailer loading device 70 of the present invention operates to move a trailer from a storage position to attachment with a vehicle for towing the trailer. The brace 50 illustrated in FIG. 6 is used to secure the trailer loading device to the tongue 52 of the trailer. Other suitable braces may be gainfully employed for connecting the trailer loading device to the trailer. The controller 124 selectively operates the actuators 82 in a forward or reverse direction, together or individually for turning the loading device. The drive gear 88 operated by the actuator communicates with the gear 80, such as through a chain or other interconnection, in order to rotate the wheel 77 forward or reverse. To turn, one of the actuators 82 is operated to drive the particular right or left wheel. For example, as illustrated in FIG. 9B, the actuator 82a operates to drive the wheel 77a, and thereby rotate the chassis 72 relative to the lifting column 94 as indicated by the arrow 121. The chassis 72 rotates relative to the lifting column 94 by the steering shaft 90 moving in the recess relative to the mount block 92.

The trailer tongue 52 moves vertically by the telescopic lifting column 94. The actuator 110 rotates the drive gear 112 that communicates with the gear 106 in order to rotate the threaded shaft 100. The shaft rotates in the threaded opening 102 and causes the outer member 98 to move relative to the inner member 96. Depending on the direction of rotation, the outer member 98 telescopically extends or retracts in order to raise and lower the tongue 52.

With use of the controller 124, and selective operation of the actuators 82 and 110, the trailer is driven by the trailer loading device from a storage location to a tow vehicle for attachment of the tongue to a tow mount on the tow vehicle. Upon attachment of the trailer to the tow vehicle, the actuator 110 is operated to drive the telescopic lifting column 94 in order to raise the drive wheels 77 from the ground. The controller 124 is detached from the trailer loading device for use during another trailer moving operation.

With reference to FIG. 10, it is appreciated that the trailer loading device in the embodiment illustrated in FIG. 11 is gainfully operated with hydraulics in a manner similar to that discussed above. The trailer loading device is raised by setting the switch 159 to direct the diverter 151 to communicate fluid from the pump 150 to the hydraulic cylinder 142. Operating switch 155 causes the pump 150 to communicate fluid to the move the hydraulic cylinder. The wheels 77 move downwardly and bear against the ground to raise the trailer tongue. The switch 155 is moved to the neutral position. The switch 159 is moved to select operation of the drive wheels 77 through the diverter valve 151. Switches 155, 157 are selectively moved to operate the wheels 77 through the respective pumps 150, 152, together or individually, to move the trailer forward, left or right, or reverse, to align the trailer receiver with a ball on a trailer hitch of a towing vehicle.

With the receiver aligned with the ball, the switch 159 is positioned for operating the hydraulic cylinder 142. The switch 155 is moved to operate the pump 150 and lower the lifting column 94 to seat the receiver on the ball. Upon securing the trailer to the tow vehicle, the wheels 77 are further raised from the ground for towing of the trailer by the tow vehicle. The controller 154 is detached from the control box 148. The switches 155, 157, and 159 are operated in a similar manner for detaching a trailer from a tow vehicle and moving the trailer to a storage location. It is to be appreciated that a single hydraulic pump may be gainfully employed, with a plurality of diverter valves to select the communication of the hydraulic fluid to the drive motors for the wheels or to the hydraulic cylinder, or in an alternate embodiment, a separate hydraulic pump for each. Similarly, the drive wheels could be operated with electric drive motors while the lifting column operates with the hydraulic cylinder.

Personnel at trailer storage locations and trailer handling facilities can be provided with a number of controllers 124 (or 154 for hydraulic systems) for operating trailer loading devices mounted to trailers for attaching and detaching trailers from tow vehicles and moving the trailers to storage positions.

The invention also provides a method for bringing a trailer coupling into close proximity with a receiver hitch by attaching the hitching apparatus (or trailer loading device) to a trailer tongue by means of the vertical column, then guiding the trailer toward a towing vehicle using a remote control device to direct the speed and direction of turn of the wheels as the trailer is being guided toward the towing vehicle. Once the trailer tongue coupling is in close enough proximity to the receiver hitch, the coupling is guided over the receiver hitch and lowered over the hitch by raising and lowering the vertical column.

It will be apparent to those of skill in the art, having the benefit of the present disclosure, that modifications, changes; and variations can be made to provide embodiments which remain within the scope of the invention as set forth in the appended claims, which provides a trailer hitching apparatus that not only moves the trailer to the towing vehicle, but also raises and lowers the trailer tongue to facilitate coupling. The design of the invention allows the operator of the trailer hitching apparatus to perform the necessary steps of moving the trailer and attaching the hitch from a distance, using a remote control device, while maintaining a clear view of the distance and position of the trailer tongue and the receiver hitch on the towing vehicle.

What is claimed is:

1. A trailer loading device for moving a trailer between a storage position and attachment of a tongue of a trailer to a tow vehicle, comprising a vertical lifting column selectively extendable and retractable by a mover, said vertical lifting column having a steering shaft at a lower end, said vertical lifting column rotatably connected to a chassis by a mount that receives a portion of the steering shaft, the chassis having opposing drive wheels selectively operable by a first actuator and a second actuator for moving the chassis.

2. The trailer loading device as recited in claim 1, wherein the chassis comprises a pair of plates interconnected by transverse support members.

3. The trailer loading device as recited in claim 2, wherein the first and second actuator each attach to a respective one of the pair of plates and operatively engage a respective one of the drive wheels for selective rotation thereof.

4. The trailer loading device as recited in claim 3, wherein the mount for the steering shaft connects to the chassis by a pin extending between the transverse support members.

5. The trailer loading device as recited in claim 1, wherein the vertical lifting column comprises an inner member received in an outer member for relative movement therebetween.

6. The trailer loading device as recited in claim 5, wherein the inner member connects to the mount block.

7. The trailer loading device as recited in claim 5, wherein the mover connects to the inner member and to the outer member.

8. The trailer loading device as recited in claim 5, wherein the mover comprises a threaded shaft extending through a threaded bore at a distal end of the inner tubular member and operatively connected to a rotator attached to the outer tubular member for rotating the threaded shaft.

9. The trailer loading device as recited in claim 8, wherein the rotator comprises:
a plate attached to the distal end of the outer tubular member;
a driven gear attached to a distal end of the threaded shaft;
a motor having a drive gear attached to the plate and connected operatively to the controller, with the drive gear operatively engaged to the driven gear,
whereby operation of the motor causes the threaded shaft to rotate.

10. The trailer loading device as recited in claim 9, wherein the motor is electric.

11. The trailer loading device as recited in claim 5, wherein the mover comprises a hydraulic cylinder connected to a supply of hydraulic fluid and attached at opposing distal ends to the inner member and the outer member for selective extending and retracting thereof.

12. The trailer loading device as recited in claim 1, further comprising a controller for selective operation of the drive wheels and for selective operation of the traveler column.

13. The trailer loading device as recited in claim 1, wherein the first and second actuators are each an electric motor operative connected through the controller to a supply of electrical current.

14. The trailer loading device as recited in claim 13, further comprising a switch to select a direction of flow of electrical current for selectively rotating the drive wheels.

15. The trailer loading device as recited in claim 1, wherein the first and the second actuators are hydraulic motors operatively connected to a supply of hydraulic fluid.

16. The trailer loading device as recited in claim 15, further comprising a valve for selectively controlling the rotation of the hydraulic motors.

17. The trailer loading device as recited in claim 1, wherein the plates are angularly offset so that the first and second actuators are disposed in vertically offset relation.

18. The trailer loading device as recited in claim 1, further comprising a mounting bracket engaged to the vertical lifting column for attaching to a tongue of a trailer.

19. A trailer loading device for attachment to a tongue of a trailer, comprising:
a pair of plates each having an actuator mount portion and a wheel support portion that define an axle bore therein, the plates interconnected by transverse support members;
a first and second actuator, each attached to a respective one of the plates in the actuator mount portion;
a pair of opposing drive wheels, each mounted on an axle extending from the axle bore of the plates and each operatively engaged to a respective one of the actuators;
a steering shaft having a base portion mounted on a pin extending between the transverse plates and an extending cylindrical coupler;
a mount block that receives the coupler;
means for rotating the base portion relative to the mount block;
a telescopically extendable member having an inner tubular member received in an outer tubular member for relative movement therebetween, the inner tubular member attached at a first end to the mount block;
a mover operatively engaged to the inner tubular member and the outer tubular member; and
a controller operatively connected to the first and second actuators for selective movement of the drive wheels and to the mover for selective extending and retracting of the outer tubular member relative to the inner tubular member.

20. The trailer loading device as recited in claim 19, wherein the mover comprises a threaded shaft extending through a threaded bore at a distal end of the inner tubular member and operatively connected to a rotator attached to the outer tubular member for rotating the threaded shaft.

21. The trailer loading device as recited in claim 20, wherein the rotator comprises:
a plate attached to the distal end of the outer tubular member;
a driven gear attached to a distal end of the threaded shaft;
a motor having a drive gear attached to the plate and connected operatively to the controller, with the drive gear operatively engaged to the driven gear,
whereby operation of the motor causes the threaded shaft to rotate.

22. The trailer loading device as recited in claim 19, wherein the mover comprises a hydraulic cylinder connected to a supply of hydraulic fluid and attached at opposing distal ends to the inner tubular member and the outer tubular member for selective extension and retracting thereof.

23. The trailer loading device as recited in claim 19, wherein the first and the second actuator are each an electric motor operative connected through the controller to a supply of electrical current.

24. The trailer loading device as recited in claim 23, further comprising a switch to select a direction of flow of electrical current for selectively rotating the drive wheels.

25. The trailer loading device as recited in claim 19, wherein the first and the second actuators are hydraulic motors operatively connected to a supply of hydraulic fluid.

26. The trailer loading device as recited in claim 25, further comprising a valve for selectively controlling the rotation of the hydraulic motors.

27. The trailer loading device as recited in claim 19, further comprising a mounting bracket engaged to the outer tubular member for attaching to a tongue of a trailer.

28. The trailer loading device as recited in claim 19, wherein the plates are angularly offset so that the first and second actuators are disposed in vertically offset relation.

29. The trailer loading device as recited in claim 19, wherein means for rotating the base portion relative to the steering shaft comprises operatively connecting the base portion to the second actuator.

30. The trailer loading device as recited in claim 19, wherein means for rotating the base portion relative to the steering shaft comprises operatively connecting the actuators for independent operation wherein one drive wheel selectively rotates at a different rate than the other drive wheel.

31. A trailer loading device providing selective travel of drive wheels and independent vertical movement thereof for attachment to a tongue of a trailer for moving the trailer between a storage place and a trailer moving vehicle, comprising:
   a pair of spaced-apart, angularly offset plates each having an actuator mount portion and a wheel support portion that define an axle bore therein, the plates interconnected by transverse support members;
   a first and second actuator each attached to a respective one of the plates in the actuator mount portion;
   a pair of opposing drive wheels, each mounted on an axle extending from the axle bore of the plates and operatively engaged to a respective actuator;
   a steering shaft having a base mounted on a pin extending between the transverse plates and an extending cylindrical coupler;
   a mount block that receives the coupler within a cylindrical bore for movement of the steering shaft relative to the mount block;
   a telescopically extendable inner member received in an outer member, the inner member attached at a first end to the mount block;
   a mover operatively connected to the inner member and to the outer member; and
   a controller operatively connected to the first and second actuators for selective movement of the drive wheels and to the mover for selective extending and retracting of the outer tubular member relative to the inner tubular member.

32. The trailer loading device as recited in claim 31, wherein the first and the second actuators are each an electric motor operatively connected through the controller to a supply of electrical current.

33. The trailer loading device as recited in claim 32, further comprising a switch for selectively directing the flow of electrical current for forward and reverse rotation of the drive wheels.

34. The trailer loading device as recited in claim 31, wherein the mover comprises a threaded shaft extending through a threaded bore at a distal end of the inner member and operatively connected to a rotator attached to the outer member for rotating the threaded shaft.

35. The trailer loading device as recited in claim 34, wherein the rotator comprises:
   a plate attached to the distal end of the outer member;
   a driven gear attached to a distal end of the threaded shaft;
   a motor having a drive gear attached to the plate and connected operatively to the controller, with the drive gear operatively engaged to the driven gear,
   whereby operation of the motor causes the threaded shaft to rotate.

36. The trailer loading device as recited in claim 31, wherein the mover comprises a hydraulic cylinder connected to a supply of hydraulic fluid and attached at opposing distal ends to the inner tubular member and the outer tubular member for selective extension and retracting thereof.

37. The trailer loading device as recited in claim 36, wherein the first and the second actuator are each an electric motor operative connected through the controller to a supply of electrical current.

38. The trailer loading device as recited in claim 37, further comprising a switch to select a direction of flow of electrical current for selectively rotating the drive wheels.

39. The trailer loading device as recited in claim 36, wherein the first and the second actuators are hydraulic motors operatively connected to a supply of hydraulic fluid.

40. The trailer loading device as recited in claim 39, further comprising a valve for selectively controlling the rotation of the hydraulic motors.

41. The trailer loading device as recited in claim 31, wherein the first and the second actuators are hydraulic motors operatively connected to a supply of hydraulic fluid.

42. The trailer loading device as recited in claim 31, further comprising a valve for selectively controlling the rotation of the hydraulic motors.

43. The trailer loading device as recited in claim 31, further comprising a mounting bracket engaged to the outer tubular member for attaching to a tongue of a trailer.

\* \* \* \* \*